Figure 1:
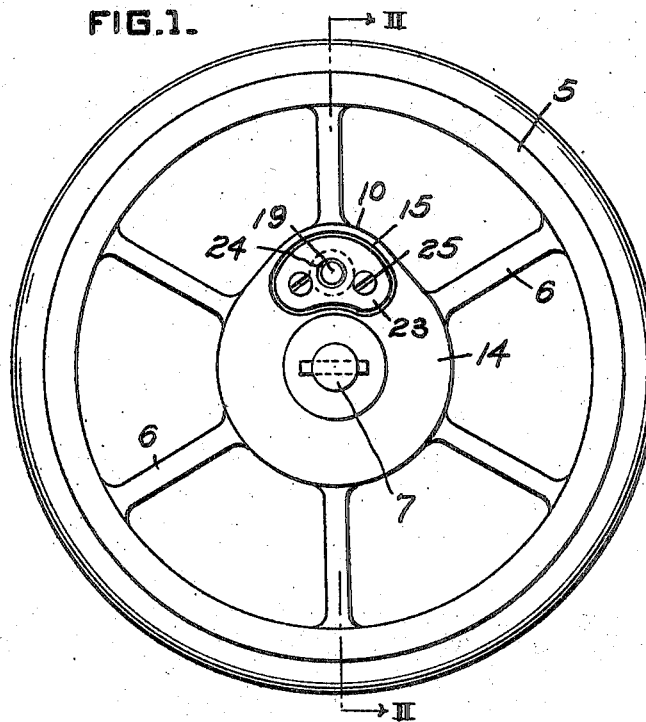

C. MALT.
MINE CAR WHEEL.
APPLICATION FILED JUNE 1, 1921.

1,417,085. Patented May 23, 1922.

WITNESSES
J. Herbert Bradley

INVENTOR
Charles Malt,
by Grant McCallister
his attorneys in fact.

UNITED STATES PATENT OFFICE.

CHARLEY MALT, OF IRWIN, PENNSYLVANIA.

MINE-CAR WHEEL.

1,417,085.  Specification of Letters Patent.  Patented May 23, 1922.

Application filed June 1, 1921. Serial No. 474,306.

*To all whom it may concern:*

Be it known that I, CHARLEY MALT, a citizen of the United States, and a resident of Irwin, in the county of Westmoreland and State of Pennsylvania, have made a new and useful Invention in Mine-Car Wheels, of which the following is a specification.

This invention relates to mine car wheels and more particularly to improvements in self-lubricating wheels of this class.

An object of this invention is to provide an integral self-lubricating mine car wheel of simple and cheap construction, in which the proper amount of lubricant at all times during operation of the wheel is automatically distributed to the axle upon which the wheel is journaled.

This, as well as other objects, I attain by means of the construction described in the specification and illustrated in the drawings accompanying and forming a part of this application and throughout the several views of which, similar elements are denoted by like characters.

Figure 2:
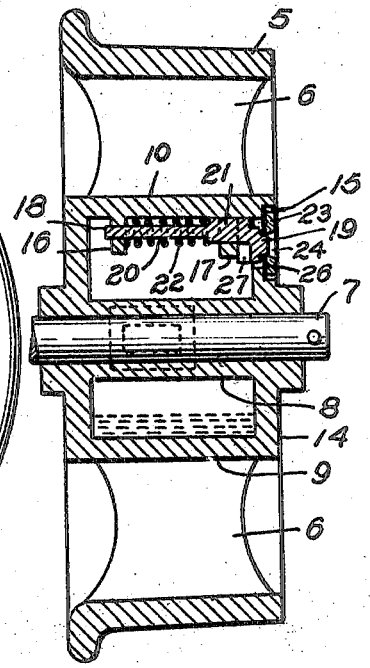
Figure 3:
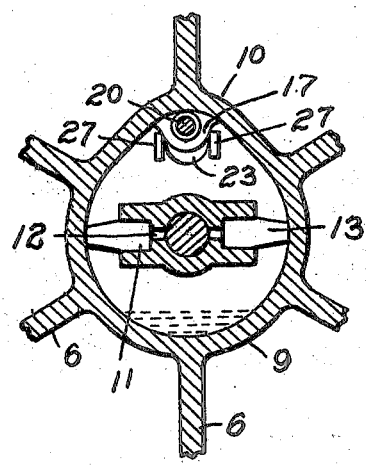
Figure 4:
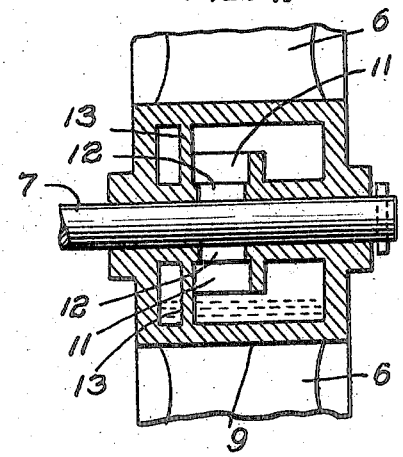

In the drawings, Figure 1 is a side elevation of a wheel made in accordance with this invention. Fig. 2 is a cross section taken on line II—II of Fig. 1. Fig. 3 is a fragmentary sectional view of the hub portion of the wheel and Fig. 4 is a fragmentary view in cross section of said hub portion.

The body or major portion of the wheel comprising the tread or wheel rim 5 and spokes 6 may be of any desired construction and is adapted to be journaled upon an axle 7.

The center portion of the wheel comprises a hub bearing member 8 bored to receive the axle and a box-like member 9 surrounding the hub bearing member and provided with an offset portion 10. The box-like member provides a lubricant reservoir and extending outwardly from the hub bearing member and into the oil reservoir are oppositely positioned lubricant guides 11 formed in the nature of boxes or wells. The bottoms of these boxes are provided with slots as shown at 12, through which lubricant may pass to the axle.

A lubricant feeding stem 13 of relatively small cross section extends from the outer end of each box or well 11 to the adjacent inner wall of box 9 which forms the oil reservoir.

One end wall 14 of the lubricant box or well is provided with an opening 15 and in line therewith, the curved wall of the box is provided with inwardly extending ears 16 and 17 which are pierced to receive the stem 18 of a valve 19 which serves as a filling valve for the lubricant chamber. Stem 18 is formed in two diameters 20 and 21 and the head or valve portion 19 which is preferably formed integral with the stem is eccentric thereto. Between the shoulder formed at the junction of the several parts of the stem and the inner ear 16, a coil spring 22 is located.

A closure plate 23 is provided for opening 15 and this plate which is provided with a filling opening 24 is formed with a seat for valve 19. The cover plate is secured to the end plate 14 by means of screws 25 and between the plate 23 and that portion of end plate 14 which is recessed to receive the same, a flexible washer 26 is interposed. Two positioning lugs 27 extend inwardly from cover plate 23 on opposite sides of head 19 and serve to prevent the head from turning about its stem.

In operation, the lubricant well will be partially filled with lubricant, such as oil as shown in Figs. 2, 3 and 4 and as the wheel revolves the feeder fingers 13 passing through the oil will pick up a small amount of the same and that small portion on its surface adjacent the wells 11 will flow through the wells to the axle as the feeding fingers alternately rise above the axle. From this, it will be seen that the oil will be automatically fed to the axle in relatively small amounts instead of in large amounts as is the case with most of the self-lubricating mine car wheels with which I am familiar.

Having thus described my invention, what I claim is:—

1. The combination with a mine car axle, of a wheel journaled thereon and having a hub-bearing member slotted to provide a lubricant passage, a chamber surrounding the bearing member and having a curved outer wall provided with an offset, a filling device within said offset and feeding fingers extending from said hub-bearing member to said curved wall for guiding lubricant through said lubricant passage.

2. The combination with a mine car axle, of a wheel journaled thereon and having a hub-bearing member slotted to provide a lubricant passage to said axle, a chamber surrounding said bearing member, having a curved wall provided with inwardly extending guides, an opening in said chamber alined with said guides, a valve device insertable through said opening and mounted within said guides, a cover plate closing said opening and provided with a seat for said valve device and fingers extending from said curved wall to said lubricant passage.

3. The combination with a mine car axle, of a wheel journaled thereon and having a hub-bearing member provided with box-like structures forming lubricant guides, and having open bottoms leading to said axle, a housing surrounding said bearing member and said box-like structures and feeding fingers extending from said structures to said housing.

In testimony whereof, I have hereunto subscribed my name this 26th day of May, 1921.

CHARLEY MALT.